US006543561B1

United States Patent
Pels et al.

(10) Patent No.: US 6,543,561 B1
(45) Date of Patent: Apr. 8, 2003

(54) DRIVE SYSTEMS FOR A MOTOR VEHICLE AND METHODS FOR OPERATING THE SAME

(75) Inventors: Thomas Pels, Achern (DE); Klaus Revermann, Schwerinsdorf (DE)

(73) Assignee: Continental ISAD Electronic Systems GmbH & Co. KG, Landsberg (DE)

(*) Notice: Subject to any disclaimer, the term of this patent is extended or adjusted under 35 U.S.C. 154(b) by 0 days.

(21) Appl. No.: 09/672,176

(22) Filed: Sep. 27, 2000

Related U.S. Application Data

(63) Continuation of application No. PCT/EP99/02218, filed on Mar. 31, 1999.

(30) Foreign Application Priority Data

Mar. 31, 1998 (DE) .......................... 198 14 402

(51) Int. Cl.[7] .................................. B60K 6/04

(52) U.S. Cl. ...................... 180/65.2; 180/65.3

(58) Field of Search .............. 180/65.1, 65.2, 180/65.3, 65.8; 477/5; 701/22

(56) References Cited

U.S. PATENT DOCUMENTS

| | | | |
|---|---|---|---|
| 4,455,543 A | | 6/1984 | Pischinger et al. ......... 335/266 |
| 5,632,238 A | * | 5/1997 | Furukawa et al. ....... 123/179.3 |
| 5,656,921 A | * | 8/1997 | Farrall ........................ 180/65.2 |
| 5,713,425 A | * | 2/1998 | Buschhaus et al. ........ 180/65.2 |
| 5,725,064 A | * | 3/1998 | Ibaraki et al. ............. 180/65.2 |
| 5,755,302 A | | 5/1998 | Lutz et al. ................. 180/65.2 |
| 5,909,720 A | * | 6/1999 | Yamaoka et al. .......... 180/65.2 |
| 6,142,907 A | * | 11/2000 | Minowa et al. ............ 180/65.2 |
| 6,176,807 B1 | * | 1/2001 | Oba et al. .................. 180/65.2 |
| 6,208,034 B1 | * | 3/2001 | Yamaguchi ................ 180/65.2 |

FOREIGN PATENT DOCUMENTS

| | | |
|---|---|---|
| DE | 30 24 109 A1 | 6/1980 |
| DE | 33 35 923 A | 10/1983 |

(List continued on next page.)

OTHER PUBLICATIONS

Patent Application entitled, "System for Actively Reducing Rotational Nonuniformity of a Shaft, in Particular, the Drive Shaft of an Internal Combustion Engine, and Method for This" with drawings, pp. 42.

J. Daniels, "Toyota reveals more", Automotive Engineer, vol. 22, No. 5, Jun. 1, 1997, pp. 54 to 64.

*Primary Examiner*—Avraham Lerner
(74) *Attorney, Agent, or Firm*—Blakey, Sokoloff, Taylor & Zafman

(57) ABSTRACT

The invention relates to drive systems for a motor vehicle, with an internal combustion engine (1) and at least one electric machine (6, 6'), each of which can be used independently as a drive motor for the vehicle, the drive systems being constructed in such a way that the vehicle drive-away phase proceeds as follows:

i) the vehicle is initially accelerated by the electric machine (6, 6') alone, ii) during this process, the internal combustion engine (1) is started, iii) the internal combustion engine (1) then takes over the driving of the vehicle, jerky coupling of the internal combustion engine (1) in the course of steps i) to iii) being avoided either by a) entraining the internal combustion engine (1) while the electric machine (6, 6') is accelerating the vehicle, or b) the internal combustion engine (1) being accelerated for the purpose of starting while decoupled from the drive and being coupled to the drive at the synchronous speed.

The invention is also directed towards corresponding methods for operating a drive system.

13 Claims, 3 Drawing Sheets

FOREIGN PATENT DOCUMENTS

| | | |
|---|---|---|
| DE | 33 35 923 A1 | 10/1983 |
| DE | 43 23 601 A1 | 7/1993 |
| DE | 195 30 231 A1 | 8/1995 |
| DE | 195 32 129 A1 | 8/1995 |
| DE | 195 39 571 A1 | 10/1995 |
| EP | 0 743 215 A2 | 5/1996 |
| EP | 0 743 216 A2 | 5/1996 |
| EP | 0 819 561 A2 | 6/1997 |

* cited by examiner

DRIVE SYSTEMS FOR A MOTOR VEHICLE AND METHODS FOR OPERATING THE SAME

This is a continuation of PCT/EP99/02218 filed on Mar. 31, 1999, which claims priority from German Patent Application No. 198 14 402.4 filed on Mar. 31, 1998.

BACKGROUND OF THE INVENTION

1) Field of the Invention

The invention relates to drive systems for a motor vehicle, with an internal combustion engine and at least one electric machine, each of which can be used independently as a drive motor for the vehicle. The invention furthermore relates to methods for operating such a drive system. Drive systems of this kind, in which the internal combustion engine and the electric machine can each independently take over the driving of the vehicle are also known as "parallel hybrid drives".

2) Discussion of Related Art

One important aim in developing motor-vehicle drives is to reduce emissions of pollutants and noise caused by internal combustion engines. A critical area in this context is the drive-away phase of the vehicles: here, high specific fuel consumption and relatively high pollutant emissions occur. The latter is troublesome particularly in towns owing to the higher frequency of drive-away events in these areas. In addition, there is increased noise pollution due to the acceleration of the engines before clutch engagement.

In this context, parallel hybrid drives offer the possibility of accelerating the vehicle exclusively with the aid of an electric drive in the drive-away phase and only bringing in the internal combustion engine when the operating point is in a more favourable range as regards efficiency and pollutant emissions. One such solution is known, for example, from DE 33 35 923 A1. Here, after driving away electrically, the internal combustion engine is connected to the driven wheels via the electric machine by means of a clutch. The engine is started by the engagement of the clutch. A corresponding solution is known from EP 0 743 216 A2. There, the internal combustion engine is not coupled to the drive train mechanically but with the aid of an electromagnetic clutch. Coupling the stationary internal combustion engine to the rotating drive train has the disadvantage that a relatively large torque has to be supplied suddenly. This can lead to a jerky drop in the driving torque. To mitigate this unwanted effect, the internal combustion engine is constructed with a disengageable flywheel in the first-mentioned DE 33 35 923 A1. It is thereby possible to reduce its moment of inertia, allowing it to be "brought up" more easily upon clutch engagement. In EP 0 743 216 A2, mentioned second, the jerky drop in torque is counteracted with a corresponding increase in the electric driving torque.

It is also known, with hybrid drives, to perform synchronisation during gear changes.

DE 195 30 231 A1, for instance, has disclosed a hybrid drive in which the electric motor is decoupled during gear changes and then at least approximately brought into synchronism with the drive shaft for re-engagement. There, the decoupling and coupling of the electric motor is used for simplified control of the synchronisation of the change gear. However, this is not related to the drive-away phase of the vehicle.

DE 195 39 571 A1 has furthermore disclosed a hybrid drive in which the internal combustion engine and the electric motor are coupled by means of an electrodynamic converter. The electric motor is used to bridge the gap between gears by synchronisation during gear changes. This is not related to the drive-away phase of the vehicle either.

SUMMARY OF THE INVENTION

According to a first aspect, a drive system for a motor vehicle is having an internal combustion engine and at least one electric machine, each of which can be used independently as a drive motor for the vehicle. The drive system is constructed in such a way that the drive-away phase of the vehicle proceeds as follows:

i) the vehicle is initially accelerated by the electric machine alone, ii) during this process, the internal combustion engine is started, iii) the internal combustion engine then takes over the driving of the vehicle, jerky coupling of the internal combustion engine in the course of steps i) to iii) being avoided by entraining the internal combustion engine while the electric machine is accelerating the vehicle.

According to a second aspect, a drive system for a motor vehicle is having an internal combustion engine and at least one electric machine, each of which can be used independently as a drive motor for the vehicle. The drive system is constructed in such a way that the drive-away phase of the vehicle proceeds as follows:

i) the vehicle is initially accelerated by the electric machine alone, ii) during this process, the internal combustion engine is started, iii) the internal combustion engine then takes over the driving of the vehicle, jerky coupling of the internal combustion engine in the course of steps i) to iii) being avoided by the internal combustion engine being accelerated for the purpose of starting while decoupled from the drive and being coupled to the drive at the synchronous speed.

According to another aspect, a method for operating a drive system for a motor vehicle, which is fitted with an internal combustion engine and at least one electric machine, each of which can be used independently as a drive motor for the vehicle, has the following steps:

i) the vehicle is initially accelerated by the electric machine alone, ii) during this process, the internal combustion engine (1) is started, iii) the internal combustion engine then takes over the driving of the vehicle, jerky coupling of the internal combustion engine in the course of steps i) to iii) being avoided by entraining the internal combustion engine while the electric machine is accelerating the vehicle.

According to still another aspect, a method for operating a drive system for a motor vehicle, which is fitted with an internal combustion engine and at least one electric machine, each of which can be used independently as a drive motor for the vehicle, has the following steps:

i) the vehicle is initially accelerated by the electric machine alone, ii) during this process, the internal combustion engine (1) is started, iii) the internal combustion engine then takes over the driving of the vehicle, jerky coupling of the internal combustion engine in the course of steps i) to iii) being avoided by the internal combustion engine being accelerated for the purpose of starting while decoupled from the drive and being coupled to the drive at the synchronous speed.

Other features which are inherent in the disclosed drive systems and methods will become apparent to those skilled in the art from the following detailed description and its accompanying drawings.

BRIEF DESCRIPTION OF THE DRAWINGS

In the accompanying drawings.

In the figures, components with the same or similar functions are indicated by the same reference numerals.

DETAILED DESCRIPTION OF THE INVENTION

Figure 1:
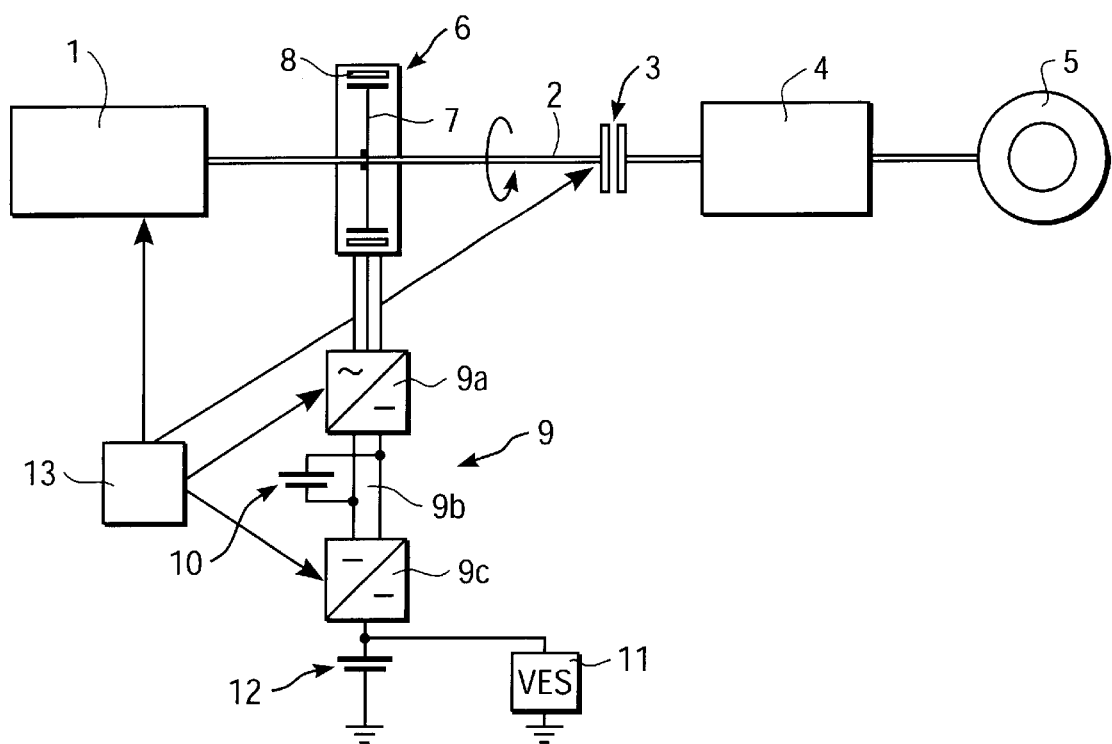
FIG. 1 shows a schematic representation of the most important functional units of a first exemplary embodiment.

Before the preferred embodiments are described in detail some remarks about the disclosed embodiments shall be placed in front.

The inventors have recognised that it would be desirable to obviate the problems known from the state of the art by eliminating the clutch jerk right at the outset, not just to mitigate its effects. According to the disclosed embodiments, this can be achieved in two ways: on the one hand by the internal combustion engine being entrained by the electric drive right at the start of the drive-away phase. In this case, the engine is simply started at the desired time, e.g. by activating the fuel supply and/or ignition. The other way is to start the internal combustion engine while it is decoupled and to bring it to a speed synchronous with the drive shaft to be coupled before the said engine is coupled to the drive. Both solutions avoid a jerky coupling process.

As already explained above, the disclosed embodiments avoid the occurrence of a starting jerk right from the outset and therefore render expensive and non-optimum solutions, in the form of an adjustable moment of inertia for example, unnecessary.

As the internal combustion engine is entrained, troublesome torque fluctuations occur solely through the action of inertia forces of the crank mechanism. According to a disclosed embodiment an electric machine coupled to the internal combustion engine actively counteracts these torque fluctuations by producing opposing (opposite-phase) torques. According to another disclosed embodiment this electric machine is the machine used as a drive motor for the vehicle. For this purpose, the machine is controlled in such a way that it superimposes the opposing torques, which generally vary rapidly with respect to time, on the driving torque (which varies only slowly in relation to the said torques).

To reduce the torque fluctuations due to compression, the internal combustion engine is, according to another disclosed embodiment, initially entrained in the decompressed state. According to another disclosed embodiment, to avoid any jerk at the transition from operation under decompression to operation under compression, compression begins gently after the initial decompressed entraining process. To achieve particularly effective damping of the non-uniformities, the decompression can advantageously be combined with the above active damping by the electric machine. According to still another disclosed embodiment, the internal combustion engine is advantageously fitted with electromagnetic or electrodynamic valve gear to achieve the decompression function (electromagnetic valve gear is known from DE 30 24 109 A1, for example). The decompression and, if appropriate, the gentle transition from decompression to compression are effected by appropriate control of the valve gear. The high demand for electrical energy of such valve gear can advantageously be covered if the electric machine used for driving acts as a generator on conclusion of the drive-away phase.

The actual starting of the entrained internal combustion engine can be brought about by activating the ignition (where present) and/or fuel injection when a sufficient speed has been reached.

Some of the disclosed embodiments relate to the second aspect, according to which the internal combustion engine is accelerated for the purpose of starting while decoupled from the drive. According to one of these disclosed embodiments, accelerating and starting of the internal combustion engine is performed by an electric machine. After starting, any further acceleration of the internal combustion engine that is required before the synchronous speed is reached can be performed under its own power. However, this is a relatively sluggish process; moreover precise synchronisation can be achieved only with difficulty in this way, as regards control. To avoid these disadvantages, another disclosed embodiment proposes that the electric machine which provides for starting also take over the task of actively bringing the internal combustion engine to the synchronous speed. In this arrangement, the electric machine can take care of acceleration to the synchronous speed on its own, that is to say, for example, fuel injection and/or ignition (where present) of the internal combustion engine is essentially activated only when the synchronous speed is reached. As an alternative, however, it is also possible for the internal combustion engine to contribute to its acceleration as it is being accelerated by the electric machine, with the fuel injection system and/or the ignition being activated at an earlier time, for example, i.e. significantly before the synchronous speed is reached.

Two different embodiments for starting the internal combustion engine in a state in which it is decoupled from the drive are disclosed:

According to a first embodiment, the electric machine which provides for starting is the same as that which provides for the acceleration of the vehicle. After accelerating the vehicle, it is decoupled from the drive, then coupled to the internal combustion engine and then accelerates the latter, with the result that it starts. The internal combustion engine is then coupled to the drive at the synchronous speed; it then takes over the driving of the vehicle. In a variant, the electric machine is constructed as a dual electric machine which has two rotors and a switchable stator. The switch can, for example, be performed by mechanical displacement of the stator or by electrical switching of a kind of double stator.

According to a second embodiment, the electric machines which provide for starting and driving of the vehicle are two separate electric machines. These operate simultaneously: one of them starts the internal combustion engine, which is decoupled from the drive, while the other accelerates the vehicle. The internal combustion engine is then coupled to the drive once the synchronous speed has been reached.

According to another disclosed embodiment, a clutch is arranged between the two electric machines. Coupling of the internal combustion engine to the drive is then effected by closing this clutch.

For all stated embodiments of the invention, it is advantageous if the machine/s used to start and/or accelerate the vehicle is/are seated on the crankshaft of the internal combustion engine or a drive shaft and co-rotates/co-rotate during driving by the internal combustion engine.

The disclosed embodiments can be used to particular advantage in the context of automatic start/stop control of the internal combustion engine. With such start/stop control, a vehicle must in fact accelerate very frequently from a state in which the internal combustion engine is switched off. The characteristics of the disclosed embodiments—absolutely delay-free driving away and low noise and pollutant emissions in the drive-away phase—are particularly advantageous in this context.

Referring now to FIG. 1, a drive system for a motor vehicle, e.g. a passenger car, has an internal combustion engine 1, which outputs torque to driven wheels 5 of the vehicle via a drive shaft 2 (e.g. the crankshaft of the internal combustion engine 1 and a shaft extension connected to it), a clutch 3 and a gearbox 4. Seated on the drive shaft 2 is an electric machine 6, in this case an asynchronous three-phase machine, which likewise serves as a source of drive. It has a rotor 7, which is seated directly on the drive shaft 2 and is connected to it in a rotationally integral manner, and a stator 8, which is supported against rotation on the housing of the internal combustion engine 1, for example. The electric machine 6 (and the devices described in greater detail below for supplying it and for energy storage) are dimensioned in such a way that they can accelerate the vehicle from rest and, at the same time, entrain the internal combustion engine 1 with them, and do this without a speed-increasing or speed reduction ratio between the electric machine 6 and the internal combustion engine 1, thus allowing both to run concurrently at the same speed at all times. In embodiments which are not shown, a reduction gear, e.g. in the form of a planetary gear, is arranged between the drive shaft 2 and the electric machine 6, with the result that the electric machine 6 rotates at twice the speed of the internal combustion engine 1, for example. The winding (not shown) of the stator 8 is supplied with electric current and voltage of virtually freely adjustable amplitude, phase and frequency by an inverter 9. The inverter is, for example, of DC/interface circuit/inverter type which, with the aid of electronic switches, chops sine-based pulses of modulated width, for example, out of an essentially constant interface-circuit DC voltage, these pulses leading, after averaging by the inductance of the electric machine 6, to almost sinusoidal currents of the desired frequency, amplitude and phase. The inverter 9 essentially comprises a DC-AC inverter 9a, an interface circuit 9b and a DC-DC converter 9c. In electrical terms, a high-capacity energy storage device 10 is situated in the interface circuit 9b. This is, for example, a short-term battery or a high-capacitance storage capacitor. The DC-DC converter 9c is coupled to a low-voltage vehicle electrical system 11 and a long-term storage device, in this case a conventional low-voltage vehicle-system battery 12. The vehicle electrical system 11 and the battery 12 are at a low voltage, e.g. 12 or 24 volts. The interface circuit 9b, on the other hand, is at an elevated voltage, e.g. at the upper limit of the low-voltage range (e.g. 42 volts) or indeed well above that, e.g. 200 to 300 volts. After the drive-away operation (described in greater detail below), during which the electric machine 6 takes electrical energy from the high-capacity storage device 10, it can function as a generator, i.e. can supply electrical energy. This is used to charge the high-capacity storage device 10 and the low-voltage battery 12 and to supply loads, e.g. high-power loads (e.g. electromagnetic valve gear) at an elevated voltage level (e.g. the level of the interface circuit) and normal loads in the low-voltage system 11, more specifically after rectification by the inverter 9a and, if appropriate, voltage reduction by the DC-DC converter 9c. During operation of the engine, the inverter 9a converts the DC voltage supplied to the interface circuit 9b by the high-capacity battery 10 into AC voltage. A higher-level control unit 13 controls the converter 9, more specifically the inverter 9a and the DC-DC converter 9c. It also controls the internal combustion engine 1 and the (automatic) clutch 3. In further embodiments (not shown), the interface circuit and the vehicle electrical system are at the same voltage level, e.g. at the upper limit of the low-voltage range (e.g. 42 volts).

Figure 2A:
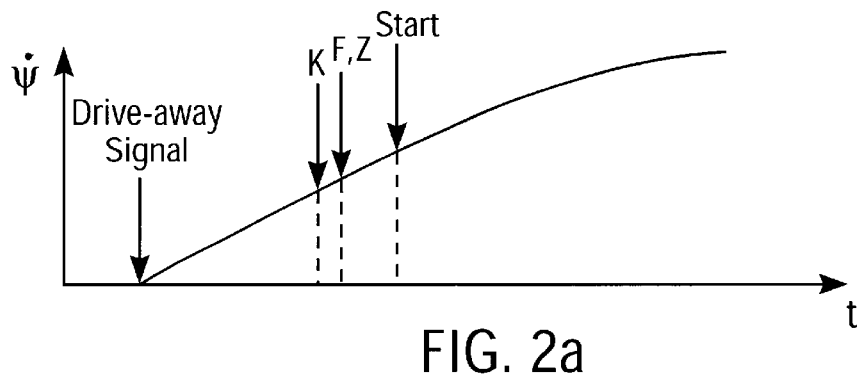
FIGS. 2a, b show a diagram associated with the first exemplary embodiment, indicating the speed of the drive as a function of time, and an associated diagram of the torque of the electric machine.

The way in which the drive system shown in FIG. 1 operates will now be explained with reference to FIG. 2: with the internal combustion engine 1 switched off, the driver of the vehicle gives a drive-away signal, e.g. by actuating the accelerator pedal. The vehicle then drives away virtually without a delay and accelerates continuously. The first part of the drive-away process is performed by the electric machine 6 until, in an almost imperceptible manner for the driver, the internal combustion engine 1 takes over. This is illustrated in the speed diagram for the drive shaft 2 in FIG. 2a.

Figure 2B:
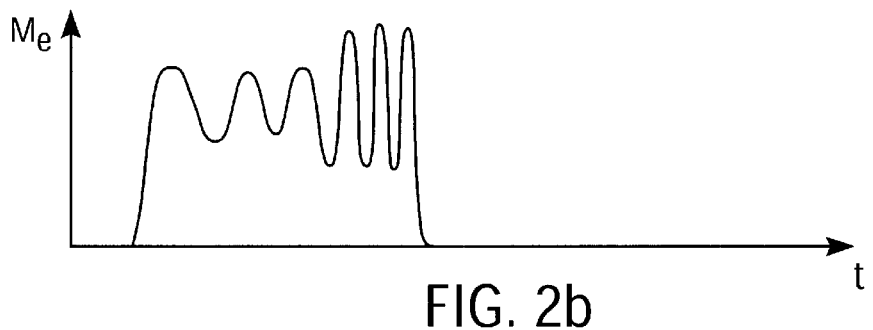

In the first phase of the drive-away process, the electric machine 6 has a dual function: on the one hand, it serves to accelerate the vehicle and, on the other hand, it simultaneously accelerates the internal combustion engine connected to it in a rotationally integral manner, allowing the latter to be started in the course of drive-away acceleration. In the first part of this phase, the internal combustion engine 1 is accelerated in the decompressed state, it being possible for decompression to be effected by keeping the exhaust valve open, for example. Valve behaviour of this kind can be achieved in a simple manner by means of electromagnetic valve control. When a sufficient speed has been reached, decompression is ended (indicated by "K" in FIG. 2a), the transition from decompression to compression preferably being a smooth one. Shortly after this, injection of fuel and activation of the ignition begins (indicated by "F, Z" in FIG. 2a). The internal combustion engine 1 then starts and takes over further acceleration of the vehicle (indicated by "starting"). To enable this drive-away process, the electric machine 6 produces a high driving torque from the time of the drive-away signal, this torque being removed when the internal combustion engine 1 takes over the driving of the vehicle. This essentially constant torque has superimposed on it an alternating torque which is equal to and in phase opposition to the torque fluctuations produced by the internal combustion engine 1 while it is being entrained. As illustrated in FIG. 2b, this superimposed alternating torque increases sharply on completion of decompression. This is because the gas forces of the internal combustion engine 1 being entrained increase at this point, requiring a correspondingly larger alternating torque to compensate.

Figure 3:
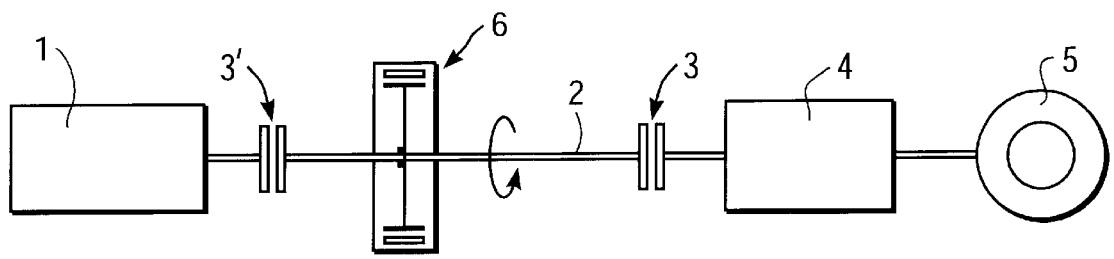
FIG. 3 shows a simplified schematic representation of a second exemplary embodiment.

In the exemplary embodiment shown in FIG. 3, a further clutch 3' is arranged in the drive train between the internal combustion engine 1 and the electric machine 6. Apart from differences in terms of control—explained in greater detail below—(i.e. differences in the programming of the control unit 13), this exemplary embodiment is otherwise identical to the exemplary embodiment described above and illustrated in FIG. 1. The above statements relating to this therefore apply also to the exemplary embodiment under consideration.

Figure 4A:
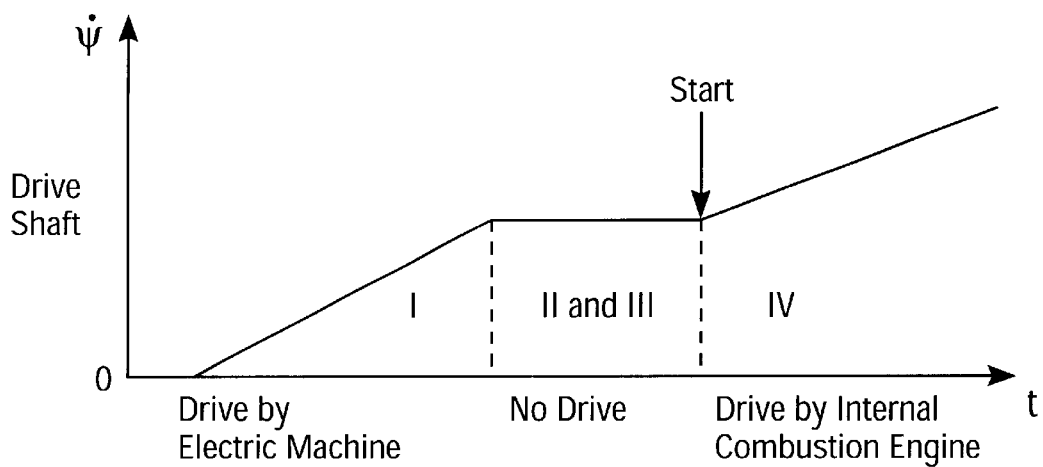
FIGS. 4a, b show a diagram corresponding to FIG. 2a and associated with the second exemplary embodiment, and an associated diagram of the speed of the electric machine as a function of time (FIG. 4b)
Figure 4B:
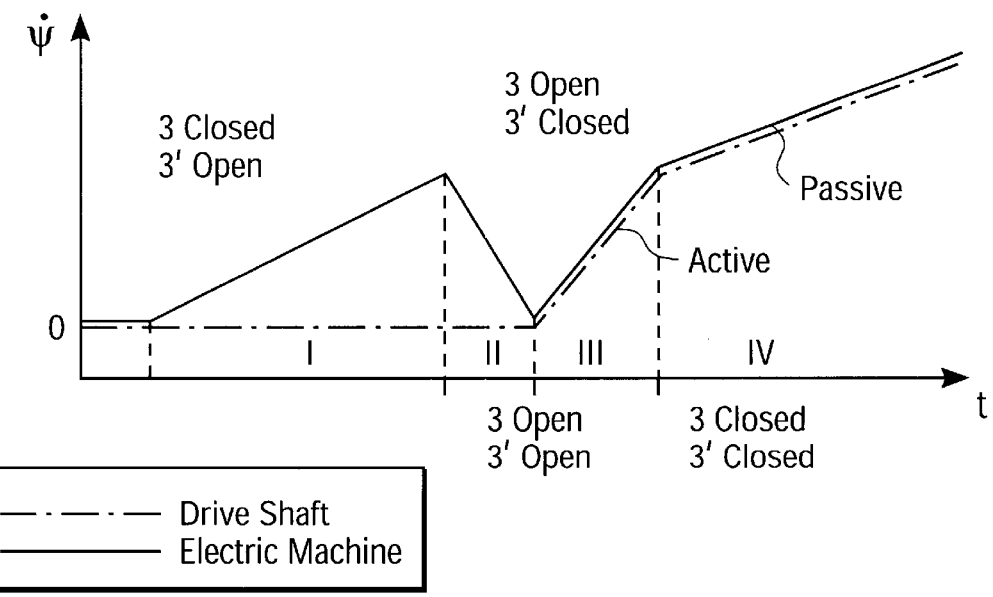

FIGS. 4a and 4b illustrate the way in which the exemplary embodiment shown in FIG. 3 works. The drive-away and starting process has four different phases I to IV. FIG. 4a shows a speed diagram of the drive shaft 2. In the first phase I, the electric machine drives the vehicle. In the subsequent phases II and III, the vehicle temporarily coasts without being driven. In the last phase IV, the vehicle is driven by the internal combustion engine 1 (although it is also possible for the electric machine 6 to provide assistance with driving in phase IV).

The rotational speed diagram in FIG. 4b shows in detail the interplay between the electric machine 6 and the internal combustion engine 1. In the diagram, the speed of the electric machine 6 is indicated by a solid line and that of the internal combustion engine 1 is indicated by a chain-dotted line. In phase I, clutch 3 is closed and clutch 3' is open. In this state, it is the electric machine 6 that accelerates the vehicle from rest to the terminal velocity of phase I. At the beginning of phase II, clutch 3 is opened. The electric machine 6 is then switched to generator mode and is quickly brought to a halt by the generator braking effect. At the beginning of the subsequent phase III, clutch 3' is closed. The electric machine 6—once again being operated as a motor—then accelerates the internal combustion engine 1 to a speed at which, first of all, it starts and then to a speed corresponding to the instantaneous speed of the drive ("synchronous speed"). This is essentially the speed achieved at the end of phase I, if appropriate reduced by a small amount owing to the phases II and III in which there is no drive. At the beginning of phase IV, clutch 3 is closed, more specifically without a jerk thanks to synchronisation. Further acceleration of the vehicle in the course of phase IV is performed by the internal combustion engine 1. The electric machine 6 then co-rotates, this being indicated by the word "passive"; it can, for example, have a slight braking effect (for operation as a vehicle alternator) or assist the periodic acceleration of the vehicle by exerting a motor effect.

Figure 5:
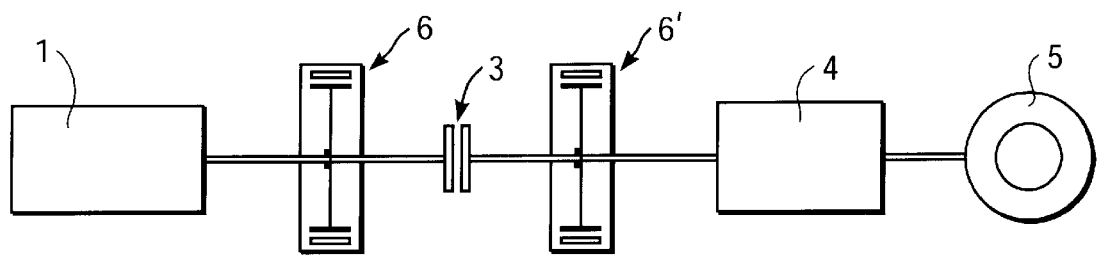
FIG. 5 shows a representation corresponding to FIG. 3 of a third exemplary embodiment with two electric machines.

The third exemplary embodiment in accordance with FIG. 5 corresponds once again to that in FIG. 1, but here a further electric machine 6' is arranged between the clutch 3 and the gearbox 4. Apart from this difference and a resulting difference in the way it operates, the statements made above in relation to FIG. 1 apply also to this exemplary embodiment.

Figure 6A:
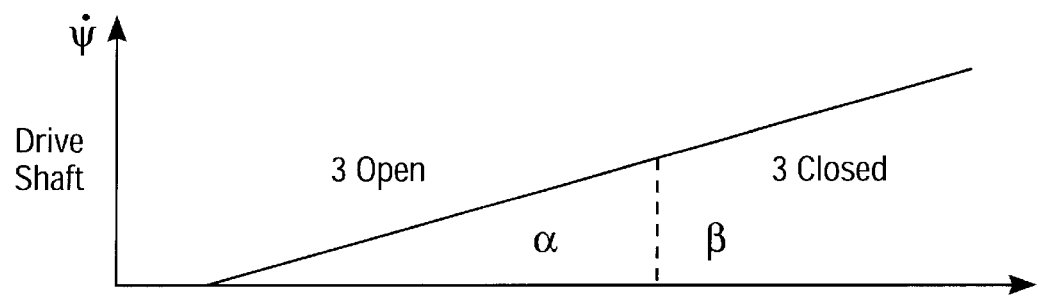
FIGS. 6a–c show diagrams corresponding to FIGS. 4a and b and associated with the third exemplary embodiment, with an additional speed/time diagram of the second electric machine.
Figure 6B:
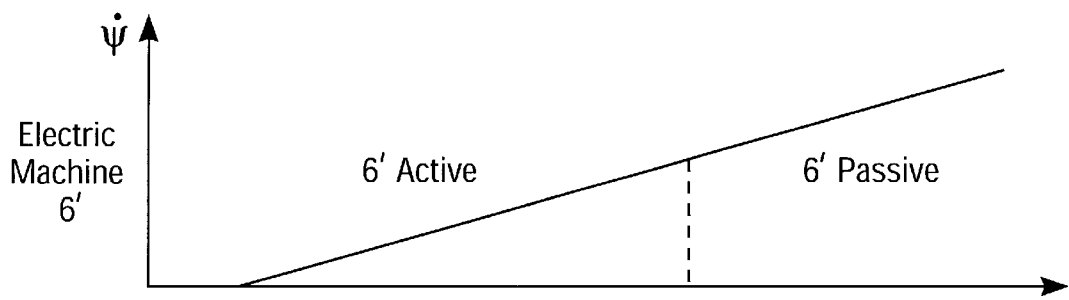
Figure 6C:
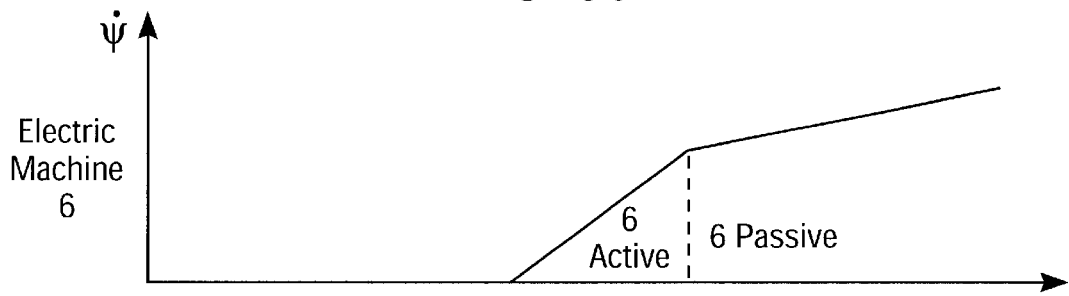

The rotational speed diagrams in FIGS. 6a to 6c illustrate the way it operates. According to FIG. 6a, the vehicle is initially driven by the electric machine 6 in a first phase α. In a subsequent, second phase β, the internal combustion engine 1 takes over the driving of the vehicle without there being an undriven phase in between. The transition is preferably designed in such a way that the speed of the drive as a function of time and its time derivative is constant at the transition, in other words there is no jump in the speed or in the change in speed as a function of time at the transition. In phase α, the clutch 3 is open while, in phase β, it is closed.

FIGS. 6b and 6c illustrate how this operation is achieved: with the clutch 3 open, the electric machine 6' accelerates the vehicle from rest up to the end of phase α (FIG. 6b). At the same time, the electric machine 6 accelerates the internal combustion engine 1, with the result that it starts. The electric machine furthermore continues to accelerate it until, at the end of phase α, the same speed as that of the electric machine 6' ("synchronous speed") has been achieved. At this point in time, the clutch 3 is closed. The internal combustion engine 1 then takes over driving, with the result that both electric machines 6, 6' co-rotate, this being indicated by the words "passive". At the same time, they can have a braking effect as generators or can assist further acceleration of the vehicle.

Although certain drive systems and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed:

1. A drive system for a motor vehicle, with an internal combustion engine and at least one electric machine, each of which can be used as a drive motor for the vehicle, the drive system being constructed in such a way that the vehicle drive-away phase proceeds as follows:
   i) the vehicle is initially accelerated by the electric machine alone,
   ii) during this process, the internal combustion engine is started,
   iii) the internal combustion engine then takes over the driving of the vehicle,
   wherein, in step i), the internal combustion engine is entrained by the electric machine so that the internal combustion engine is accelerated simultaneously with the initial acceleration of the vehicle from the outset of step i).

2. A drive system according to claim 1, in which torque fluctuations which occur while the internal combustion engine is being entrained are actively reduced by opposing torques applied by an electric machine.

3. A drive system according to claim 2, in which the opposing torques are applied by the electric machine which is driving the vehicle and are superimposed on the driving torque.

4. A drive system according to claim 1, in which the internal combustion engine is co-rotated in a decompressed state when first being entrained.

5. A drive system according to claim 4, in which compression starts smoothly after the initial decompressed entraining process.

6. A drive system according to claim 4, in which the internal combustion engine is fitted with an electromagnetic or electrodynamic valve gear, and decompression is achieved by suitable control of this valve gear.

7. A drive system according to claim 1, in which, while the internal combustion engine is being entrained, the supply of fuel and/or ignition (where present) is delayed at least until a speed sufficient for the starting of the internal combustion engine has been reached.

8. A drive system according to claim 1, in which the electric machine which provides for starting and acceleration of the vehicle is permanently coupled to the crankshaft of the internal combustion engine or a drive shaft connected to it so that both permanently correlate with the same speed.

9. A drive system according to claim 1, which is fitted with a system for automatic start/stop control of the internal combustion engine.

10. A method for operating a drive system for a motor vehicle, which is fitted with an internal combustion engine and at least one electric machine, each of which can be used as a drive motor for the vehicle, having the following steps:
  i) the vehicle is initially accelerated by the electric machine alone,
  ii) during this process, the internal combustion engine (1) is started,
  iii) the internal combustion engine then takes over the driving of the vehicle, wherein, in step i), the internal combustion engine is entrained by the electric machine so that the internal combustion engine is accelerated simultaneously with the initial acceleration of the vehicle from the outset of step i).

11. A method according to claim 10, in which torque fluctuations which occur while the internal combustion engine is being entrained are actively reduced by opposing torques applied by an electric machine.

12. A method according to claim 10, in which the internal combustion engine is co-rotated in a decompressed state when first being entrained.

13. A method according to claim 12, in which compression starts smoothly after the initial decompressed entraining process.

\* \* \* \* \*